(12) United States Patent
Blackwell et al.

(10) Patent No.: US 10,619,686 B2
(45) Date of Patent: Apr. 14, 2020

(54) BRAKE CALIPERS

(71) Applicant: LIBERTY VEHICLE TECHNOLOGIES LIMITED, London (GB)

(72) Inventors: Anthony Blackwell, London (GB); Daniel Mutch-Mathieson, London (GB); Anthony Philips, London (GB); Laurie Rippin, London (GB); Benjamin Shepherd, London (GB); Philip Thomas, London (GB); Steven Young, London (GB)

(73) Assignee: Liberty Vehicle Technologies Limited, London (GB)

( * ) Notice: Subject to any disclaimer, the term of this patent is extended or adjusted under 35 U.S.C. 154(b) by 26 days.

(21) Appl. No.: 15/775,931

(22) PCT Filed: Nov. 11, 2016

(86) PCT No.: PCT/GB2016/053557
§ 371 (c)(1),
(2) Date: May 14, 2018

(87) PCT Pub. No.: WO2017/081488
PCT Pub. Date: May 18, 2017

(65) Prior Publication Data
US 2018/0328426 A1 Nov. 15, 2018

(30) Foreign Application Priority Data
Nov. 13, 2015 (GB) .................... 1520048.8

(51) Int. Cl.
*F16D 65/00* (2006.01)
*F16D 55/228* (2006.01)
(Continued)

(52) U.S. Cl.
CPC ....... *F16D 65/0068* (2013.01); *F16D 55/228* (2013.01); *F16D 65/847* (2013.01);
(Continued)

(58) Field of Classification Search
CPC .. F16D 65/0068; F16D 55/228; F16D 65/847; F16D 65/853; F16D 2055/0016; F16D 2121/04
See application file for complete search history.

(56) References Cited

U.S. PATENT DOCUMENTS 3,448,831 A 6/1969 Newstead
3,654,689 A * 4/1972 Schwarz ............... B25B 27/026
29/888.041
(Continued)

FOREIGN PATENT DOCUMENTS

EP 1016804 A1 * 7/2000 ........... F16D 55/228
EP 1865218 A1 12/2007
(Continued)

OTHER PUBLICATIONS

United Kingdom Search Report completed Jul. 11, 2016 (GB1520048.8).
(Continued)

*Primary Examiner* — Melanie Torres Williams
(74) *Attorney, Agent, or Firm* — Robert L. Stearns; Dickinson Wright, PLLC

(57) ABSTRACT

A brake caliper (1) including a caliper body (2) with a pair of spaced limbs (3), a pair of end bridging members (4) each joining together a respective end of each limb (3) and an intermediate bridging portion (5) between the bridging members (4) and joining together a respective intermediate portion of each limb (3). Each limb (3) includes a hydraulic circuit (30) including fluidly connected hydraulic cylinders (31a, 31b, 31c) within which respective pistons (6a, 6b, 6c)
(Continued)

are received. The hydraulic circuits (30) are fluidly connected together by a fluid channel (7). Part of the fluid channel (7) is formed in the intermediate bridging portion (5) and extends diagonally across the space between the limbs (3) and between the bridging members (4).

18 Claims, 3 Drawing Sheets

(51) Int. Cl.
    *F16D 65/847*      (2006.01)
    *F16D 65/853*      (2006.01)
    *F16D 55/00*      (2006.01)
    *F16D 121/04*      (2012.01)

(52) U.S. Cl.
    CPC .... *F16D 65/853* (2013.01); *F16D 2055/0016* (2013.01); *F16D 2121/04* (2013.01)

(56) References Cited

U.S. PATENT DOCUMENTS

| | | | | |
|---|---|---|---|---|
| 3,675,743 A * | 7/1972 | Thompson | ............ | F16D 55/228 188/72.5 |
| 4,494,630 A * | 1/1985 | Stoka | ................... | F16D 55/228 188/196 R |
| 5,390,771 A * | 2/1995 | Hinkens | ................... | B62L 1/00 188/24.12 |
| 6,073,733 A * | 6/2000 | Kapanowski | ......... | F16D 55/227 188/72.4 |
| 8,272,484 B1 * | 9/2012 | Dennis | .................. | F16D 55/228 188/352 |
| 2007/0278049 A1 | 12/2007 | Kobayashi et al. | | |
| 2008/0185243 A1 | 8/2008 | Previtali et al. | | |
| 2008/0277216 A1 | 11/2008 | Cornolti et al. | | |
| 2010/0096223 A1 * | 4/2010 | Itsuaki | .................. | F16D 55/228 188/72.5 |

FOREIGN PATENT DOCUMENTS

| | | |
|---|---|---|
| EP | 1911989 A1 | 4/2008 |
| GB | 1190929 A | 5/1970 |
| JP | S5857527 A | 4/1983 |
| JP | H06280906 | 10/1994 |
| JP | H1030660 A | 2/1998 |

OTHER PUBLICATIONS

International Search Report, dated Feb. 20, 2017 (PCT/GB2016/053557).

* cited by examiner

BRAKE CALIPERS

BACKGROUND

1. Technical Field

This invention relates generally to brake calipers for vehicles. More specifically, although not exclusively, this invention relates to a disc brake caliper body and to brake calipers, braking systems and vehicles incorporating such a brake caliper body.

2. Related Art

Conventional disc brake systems for vehicles include a disc coupled to the wheels, a brake caliper within which is received an outer segment of the disc and friction pads within the caliper on either side of the disc. The brake caliper includes one or more pistons reciprocable within a respective piston chamber that selectively compresses the disc between the pads to slow the vehicle.

High performance disc brake systems often include one or more pistons on each opposing side of the disc for urging each of the brake pads toward the discs. In many such arrangements, pressurised brake fluid from the master cylinder is introduced at a single inlet and must be distributed to both sides of the caliper in order to feed the piston chamber(s) on both sides. This is generally achieved using a cross-over fluid channel joining the two sides.

EP1865218 discloses an opposed piston type disc brake caliper with a caliper body having a piston chamber channel fluidly joining multiple piston chambers on each of two side limbs and an external cross-over pipe joining one end of each channel. The external pipe is susceptible to damage, leaks in the fluid connections and the use of additional components can increase manufacturing and assembly complexity and/or costs.

JP1030660 discloses an example of an opposed piston type disc brake caliper with a caliper body having a cross-over channel drilled directly into the body. The caliper includes two side limbs and a pair of bridging portions joining respective ends of the side limbs and a cross-over channel in one of the bridging portions. The cross-channel is formed of two drillings each extending from an external surface of the body into a respective one of the opposed piston cylinders and intersecting one another at an intermediate point to provide fluid communication between the cylinders. The exposed end of one of the drillings is fitted with a bleed screw and the exposed end of the other drilling includes a banjo fitting for fluid connection with a brake master cylinder.

In use, the bridging portions at the ends of a caliper body can experience extremely high stresses and high temperatures, which can cause brake fluid to vaporise thereby resulting in brake failure. The bridging portions must therefore be configured to mitigate such issues, which can require an increase in size, weight and/or complexity of the caliper body if the cross-over channel is to be incorporated in or in close proximity to such bridging portions.

SUMMARY

It would therefore be desirable to provide a brake caliper that mitigates at least some of the issues associated with prior art designs. It is a more general non-exclusive aim of the invention to provide an improved brake caliper that provides improved stiffness characteristics and/or reduced weight and/or is less susceptible to failure and/or less expensive to manufacture and/or assemble.

Accordingly, a first aspect of the invention provides a brake caliper body comprising a pair of spaced limbs each including a hydraulic circuit and a pair of bridging portions each joining together a respective end of each limb, wherein the hydraulic circuits are fluidly connected together by a channel extending across the space between the limbs and between the bridging portions.

Thus, the channel is located in an area of the caliper body that is less susceptible to stress and heat. In fact, in embodiments of the invention a cooling duct may be provided adjacent or over or surrounding the region in which the channel is located, e.g. to further enhance the benefits of the invention. Some known caliper designs include cooling ducts located in this general region to transfer cooling air across the void between spaced limbs and directed towards the outboard piston and cylinder assemblies located within the outboard limb section. In embodiments of the invention, a cooling duct may be mounted over the space between the limbs and between the bridging portions for directing, in use, a cooling medium therethrough, thus further enhancing the ability to resist vapourisation of the hydraulic fluid within the channel.

Each of the hydraulic circuits may comprise one or more hydraulic cylinders for receiving respective pistons or actuating pistons. At least one or each hydraulic circuit may comprise two or more hydraulic cylinders for receiving respective actuating pistons, which hydraulic cylinders may be fluidly connected or interconnected. The bridging portions may comprise bridging members, limbs, segments or sections.

The bridging portions may comprise end bridging portions or may be referred to as first and second bridging portions. The pair of limbs may comprise first and second limbs. The respective hydraulic circuits may comprise first and second hydraulic circuits, for example the first limb may comprise the first hydraulic circuit and/or the second limb may comprise the second hydraulic circuit. The two or more hydraulic cylinders may comprise first and second hydraulic cylinders and, if present, third, fourth and/or subsequent hydraulic cylinders.

The caliper body may comprise one or more intermediate bridging portions, which may be between, e.g. located between, the first and second bridging portions. At least one of the intermediate bridging portions may join together a respective intermediate portion of each limb. The one or more intermediate bridging portions may comprise third and optionally fourth or subsequent bridging portions. The intermediate bridging portion may span across only a portion of the space between the limbs and first and second bridging portions. At least one of the bridging portions may be thinner than the end bridging portions.

Preferably, the intermediate bridging portion comprises a dome, bridging plate or plate portion, which may span across some, about half, most or even all of the space between the limbs and first and second bridging portions. The intermediate bridging portion may comprise a third, central bridging portion spanning and/or located at or adjacent the centre of the caliper body and/or substantially equidistant from each of the first and second bridging portions. The or at least one intermediate bridging portion may be, or extend, substantially orthogonal to the limbs or diagonal, e.g. at an oblique angle, relative thereto.

At least part of the channel may be formed in the or one of the intermediate bridging portions. The or one of the intermediate bridging portions may comprise a channel portion formed therein. The channel portion formed in the intermediate bridging portion may extend across, e.g. laterally across, the space between the limbs and/or between, e.g. at a location between, the bridging members. The hydraulic circuits may be fluidly connected together via the channel portion of the intermediate bridging portion.

Another aspect of the invention provides a brake caliper body comprising a pair of spaced limbs, a pair of bridging members each joining together a respective end of each limb and an intermediate bridging portion between the bridging members and joining together a respective intermediate portion of each limb, wherein each limb comprises a hydraulic circuit including two or more fluidly connected hydraulic cylinders for receiving respective pistons, the intermediate bridging portion comprises a channel portion formed therein and extending across the space between the limbs and between the bridging portions and the hydraulic circuits are fluidly connected together via the channel portion of the intermediate bridging portion.

At least part of the channel portion formed in the intermediate bridging portion may extend across the space between the limbs. The intermediate bridging portion may comprise a surface feature, which may be adjacent or at least partially surrounding the channel. The surface feature is preferably suitable or configured or adapted for improving heat transfer between brake fluid contained, in use, within the channel and a cooling medium passing over the caliper body. The surface feature may comprise a profile, one or more projections, depressions or interruptions in the surface or any other feature suitable for improving heat transfer.

The or at least one of the intermediate bridging portions may be separable, detachable and/or initially separate from the caliper body or one or both limbs thereof. In embodiments, the or at least one of the intermediate bridging portions is provided in two or more parts, one or each of which parts may be formed integrally with or separable or initially separate from one of the limbs, for example a respective limb.

The channel may be provided within a pipe, which may be separable, detachable and/or initially separate and/or external and/or fluidly connected to the caliper body or the limbs or the hydraulic circuit of each limb. Preferably, the channel is provided in a pipe at least part of which is formed integrally with the or one of the intermediate bridging portions and/or at least a portion of which is exposed, for example an outer surface of the pipe. The exposed portion of the pipe may comprise or provide the aforementioned surface feature for improving heat transfer. At least part of the pipe potion formed integrally with the intermediate bridging portion may extend across the space between the limbs.

In embodiments, the channel is formed entirely and/or integrally within the body.

The caliper body may comprise one or more openings, apertures, pockets, recesses or windows between the bridging portions and/or through or within the intermediate bridging portion. The openings, apertures or windows may extend or span across some or all of the space between the limbs.

The caliper body may comprise a disc receiving side and/or an outer or upper side, which may be opposite the disc receiving side. At least one or both or all of the bridging portions may be on the outer or an upper side of the caliper body. The caliper body may comprise a cavity, for example within which is received, in use, a peripheral portion of a brake disc and/or one or more brake pads. The cavity may be located on the receiving side of the caliper body. The cavity may include a brake pad receiving zone and/or an actuation zone.

The limbs may comprise opposing faces, each of which may include the hydraulic cylinders described, delineated or defined therein. The cavity may be described, defined, delineated or bound in part by the opposed faces and/or in part by the bridging portions, e.g. the first and second and, if present, the one or more intermediate bridging portions.

The caliper body or the cavity may comprise a brake pad receiving zone, for example which receives, in use, a pair of brake pads. The channel may extend across the space between the limbs on the outer caliper body side of, and/or aligned with, the brake pad receiving zone. The brake pad receiving zone may be described, defined, delineated or bound at least in part by the opposed faces of the limbs and/or faces, e.g. opposed or opposing faces, of the bridging portions. The opposed or opposing faces of the bridging portions may comprise opposed or opposing faces of the first and second bridging portions, each of which may span from one limb to the other. The opposed faces of the first and second bridging portions may each comprise composite faces, e.g. including multiple face segments, which may extend at different angles and/or in different planes to one another and/or comprise one or more curved faces. In one embodiment, the opposed faces of the first and second bridging portions are substantially orthogonal to the opposing faces of the limbs. The brake pad receiving zone may be described, defined, delineated or bound by the opposed faces of the limbs and the opposing faces of the first and/or second and/or intermediate bridging portions.

The or an actuation zone may be described, defined, delineated or bound between the opposed cylinders, e.g. all of the opposed cylinders. The brake pad receiving zone may comprise the actuation zone. The channel may extend across the space between the limbs on the outer caliper body side of, and/or aligned with, the actuating zone.

The caliper body may comprise a longitudinal dimension, which may be across its ends or the ends of the limbs and/or measured along a longitudinal direction and/or from one of its ends to the other. The caliper body may comprise a lateral dimension or thickness, which may be across its limbs and/or measured along a lateral direction and/or be substantially orthogonal to the longitudinal dimension or direction and/or be substantially orthogonal to the opposing faces of the limbs. The caliper body may comprise a normal dimension or height, which may be measured along a normal direction and/or be substantially orthogonal to the longitudinal dimension or direction and/or be substantially parallel to the opposing faces of the limbs. The caliper body may comprise a central plane intersecting each limb, which may intersect the centre of the actuation zone and/or the central plane of a central hydraulic cylinder and/or be located at the centre of the longitudinal dimension.

At least part of the channel may extend along and/or through and/or may intersect the central plane. Preferably, the channel is fluidly connected to each hydraulic circuit on a respective side of the central plane and/or the channel extends through the central plane. Additionally or alternatively, the channel may intersect one limb at a different normal position than the other limb such that it extends at an angle relative to the lateral dimension. Additionally or alternatively, the channel may intersect one limb, and/or be fluidly connected to one hydraulic circuit, at a different longitudinal position than the other limb and/or hydraulic circuit.

At least one or each hydraulic circuit may comprise a pair of outermost hydraulic cylinders and one or more inner hydraulic cylinders therebetween. In embodiments, the one or more inner hydraulic cylinders comprises two, three or more hydraulic cylinders.

The channel may be connected to each hydraulic circuit between the hydraulic cylinders thereof. For example, the channel may be connected to another part of the circuit between a pair of hydraulic cylinders, which may be outermost hydraulic cylinders, or connected to the hydraulic cylinders themselves. In embodiments, the channel is connected to, e.g. directly to, one of the hydraulic cylinders of one or each hydraulic circuit. The channel may be connected to, e.g. directly to, the or one of the inner hydraulic cylinders of one or each hydraulic circuit.

At least one or each hydraulic circuit may comprise a fluid conduit, which may connect the hydraulic cylinders together, e.g. in series, parallel or any other configuration. In embodiments, the channel may be connected to, e.g. directly to, the fluid conduit of one or each hydraulic circuit.

At least one or each hydraulic circuit may comprise a transition portion, which may be provided by an undercut, joining the fluid channel or portions thereof to one or more or each hydraulic cylinder. The hydraulic circuit may comprise such a transition portion at every join between the fluid channel or portions thereof and one or more or each hydraulic cylinder. The fluid conduit may comprise at least part of the transition portion and/or the hydraulic cylinder may comprise at least part of the transition portion. In embodiments, the channel may be connected to, e.g. directly to, the transition portion of one or each hydraulic circuit.

Thus, the channel may be connected to, e.g. directly to, one or more or each of the fluid channel and/or the or one of the transition portion and/or one of the hydraulic cylinders of one or each hydraulic circuit. It will be appreciated that any such combination is envisaged without departing from the scope of the invention.

At least one of the limbs or hydraulic circuits may comprise a hydraulic fluid inlet. The hydraulic fluid inlet may be connected to the hydraulic circuit, for example at or adjacent an end of the caliper body, limb or fluid conduit or between the hydraulic cylinders or between the outermost hydraulic cylinders thereof. In embodiments, the or each fluid inlet is connected to, e.g. directly to, the or one of the inner hydraulic cylinders, preferably the or a central hydraulic cylinder.

The channel may comprise a limb channel segment in one or each limb. The channel may comprise a bridging channel segment, which may fluidly connect the limb channel segments. The bridging channel segment may be in the intermediate bridging portion or in the pipe. The or each limb channel segment may comprise one end, e.g. a first end, fluidly connected or joined to the or a respective one of the hydraulic circuits and/or one end, e.g. a second end, fluidly connected or joined to the bridging channel segment. The or each limb channel segment may comprise a length described, defined, delineated or bound by its fluid connection with the or a respective one of the hydraulic circuits and its fluid connection with the bridging element. The channel and/or one or more or each of the limb channel segments and/or the bridging channel segment may comprise a drilling, for example in or through or into the caliper body. The or each limb channel segment may be formed by a drilling, e.g. a blind drilling, into the limb with at least one end plugged, e.g. by a plug that may be in interference fit within the drilling or threadedly received therein and/or engaged with an exposed end of the drilling. The bridging channel segment may be formed by a drilling, e.g. a blind drilling, into the intermediate bridging portion with at least one end plugged, e.g. by a plug that may be in interference fit within the drilling or threadedly received in and/or engaged with an exposed end of the drilling.

In embodiments, one of the limb channel segments is longer than the other. The channel, for example the bridging channel segment, may extend at an oblique angle relative to the normal dimension. The bridging channel segment may be fluidly connected to one of the limb channel segments at a different normal position to the fluid connection to the other of the limb channel segments.

Thus, a first end of the bridging channel segment may higher or closer to the outer side of the caliper body than a second end thereof. The first end may be on, at or adjacent the or a mounting side of the caliper body. The second end may be on, at or adjacent the or a non-mounting side of the caliper body.

The channel, for example the bridging channel segment, may be skewed or extend diagonally between the limbs and/or at an oblique angle relative to one or each limb and/or relative to the opposed face(s) thereof. At least one of the limb channel segments may additionally or alternatively be skewed or extend diagonally with respect to the longitudinal dimension. The channel, for example the limb channel segments and/or the bridging channel segment, may extend at an oblique angle relative to the longitudinal dimension and/or lateral dimension. The bridging channel segment may be fluidly connected to one of the limb channel segments at a different longitudinal position to the fluid connection to the other of the limb channel segments. At least part of the limb channel segments may be on opposite sides of the central plane and the channel, for example the bridging channel segment, may extend through the central plane. At least part of at least one of the limb channel segments may extend toward the central plane, e.g. from the hydraulic circuit to the bridging channel segment. At least part of at least one of the limb channel segments may extend from the hydraulic circuit to the bridging channel segment and toward the central plane.

Another aspect of the invention provides a brake caliper body comprising a pair of spaced limbs and a pair of bridging portions each joining together a respective end of each limb, each limb comprising a hydraulic circuit, e.g. including one or more hydraulic cylinders, wherein the hydraulic circuits are fluidly connected together by a channel extending diagonally across the space between the limbs and between the bridging portions.

It will be appreciated by those skilled in the art that the configuration of the channel encourages air to rise consistently within the system and move toward the bleed port at the end of one of the hydraulic circuits. Furthermore, by having the end of the bridging channel segment on the non-mounting side of the caliper body lower than end thereof on the mounting side, the external profile is reduce thereby improving packaging. Whilst not compulsory, this feature is believed to provide advantages.

In some embodiments, the caliper body is formed as or of a single piece of material and/or comprises a monobloc structure. In embodiments, the caliper body is formed of two or more parts, for example two halves, which may be joined or secured together, for example by one or more fasteners, such as bolts, screws or any other means. In embodiments, one or more of the bridging portions are provided in one or more parts, which may be joined or secured together, for example by one or more fasteners, such as bolts, screws or any other means. The caliper body may comprise one or more ports fluidly connected to and/or at the end or ends of one or more of the channel, the fluid conduit and/or the hydraulic fluid inlet. The inlet port may comprise an inlet fitting therein or connected thereto, e.g. for connection, in use, with a pipe fluidly connected to a master cylinder. One or more of the ports may comprise a bleeding port, which may include one or more bleeding screws or devices therein or connected thereto, e.g. for bleeding, in use, air from the caliper body or a braking system within which the caliper body is included or incorporated. One or more of the ports may comprise a sealing plug received therein.

The caliper body may comprise or include or have or be associated or combined with a cooling duct, e.g. for directing, in use, a cooling medium therethrough. The cooling duct may be associated, mounted, fastened or secured at and/or over the space between the limbs and/or between the first and second bridging portions. The cooling duct may be fastened to the caliper body by one or more fasteners or other securing means. In some embodiments, the cooling duct may be formed integrally with the caliper body.

Preferably, a flow passage is described, defined, delineated and/or bound, e.g. in a substantially sealed manner, by the duct and the caliper body, for example an outer surface thereof, e.g. beneath which outer surface is located the channel. The outer surface may comprise a surface of the intermediate bridging portion.

Another aspect of the invention provides a brake caliper comprising a caliper body as described above. The brake caliper may comprise a piston or respective pistons in the or each hydraulic cylinder. The brake caliper may comprise one or more, e.g. a pair, of brake pads, which may be received and/or mounted and/or connected or secured between the opposed faces of the limbs and/or within the brake pad receiving zone.

Yet another aspect of the invention provides a braking system for a vehicle comprising one or more, e.g. two or more, for example three or more, e.g. four, brake calipers as described above. The braking system may comprise one or more master cylinders fluidly connected, for example by one or more or respective pipes, to the or each brake caliper.

A further aspect of the invention provides a vehicle comprising a braking system as described above.

Another aspect of the invention provides a computer program element comprising and/or describing and/or defining a three-dimensional design for use with a three-dimensional additive or subtractive manufacturing means or device, e.g. a three-dimensional printer or CNC machine, the three-dimensional design comprising an embodiment of the brake caliper body or any relevant other feature of the brake caliper or braking system described above.

Yet another aspect of the invention provides a method of cooling brake fluid within a brake caliper, e.g. a brake caliper as described above, the method comprising passing or flowing a cooling medium through a cooling duct that directs the cooling medium directly onto and/or across an outer surface of the brake caliper beneath which surface is located a channel that fluidly connects the respective hydraulic brake circuits of a pair of spaced limbs of the calipers.

For the avoidance of doubt, any of the features described herein apply equally to any aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

THE DRAWINGS

Embodiments of the invention will now be described by way of example only with reference to the accompanying drawings in which.

DETAILED DESCRIPTION

Figure 1:
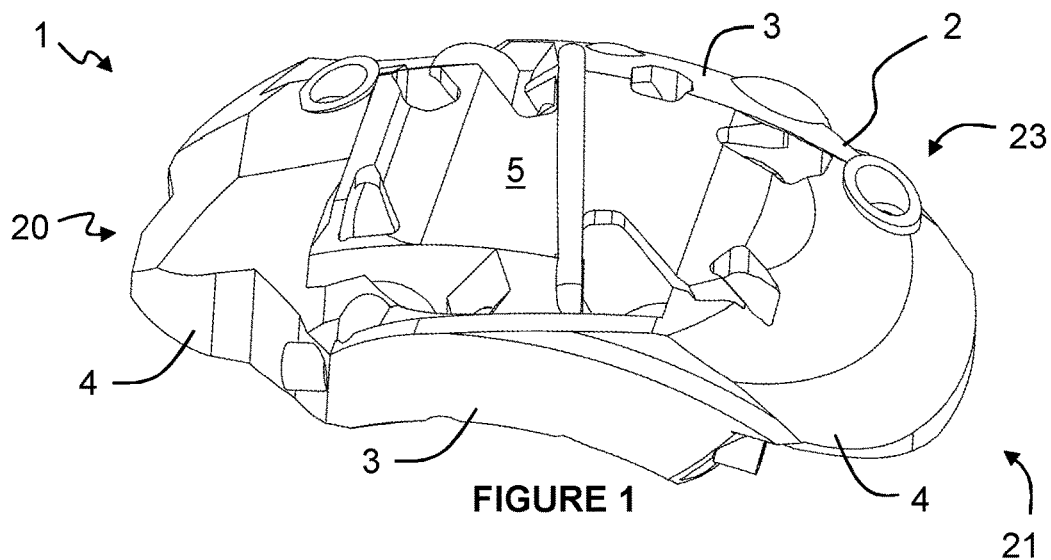
FIG. 1 is a perspective view a brake caliper according to an aspect of the invention from the non-mounting side thereof.
Figure 2:
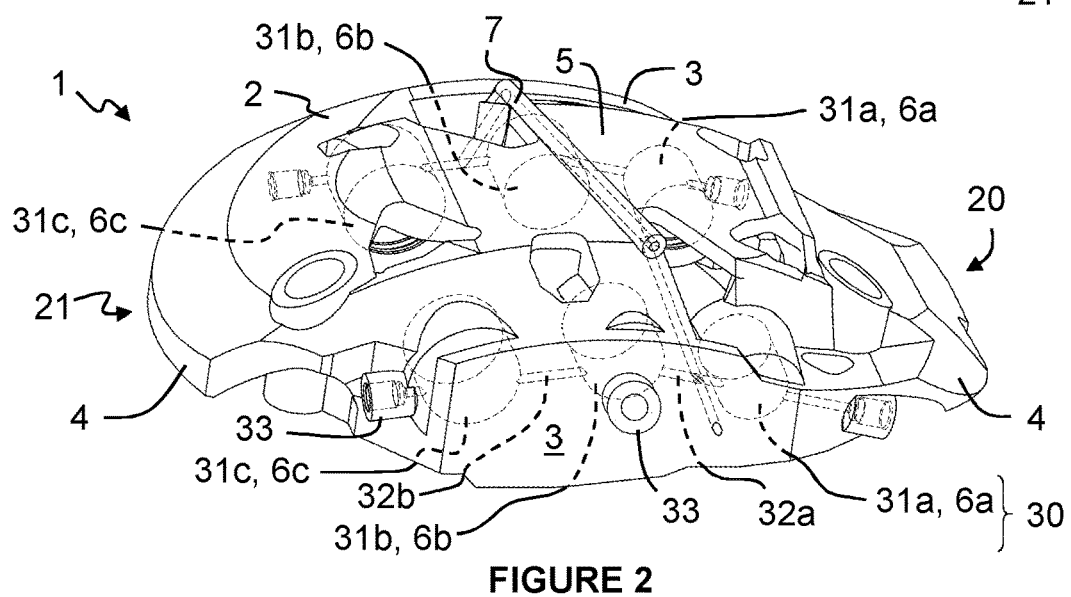
FIG. 2 is a perspective view of the brake caliper of FIG. 1 from the mounting side thereof with the hydraulic circuit outlined.
Figure 3:
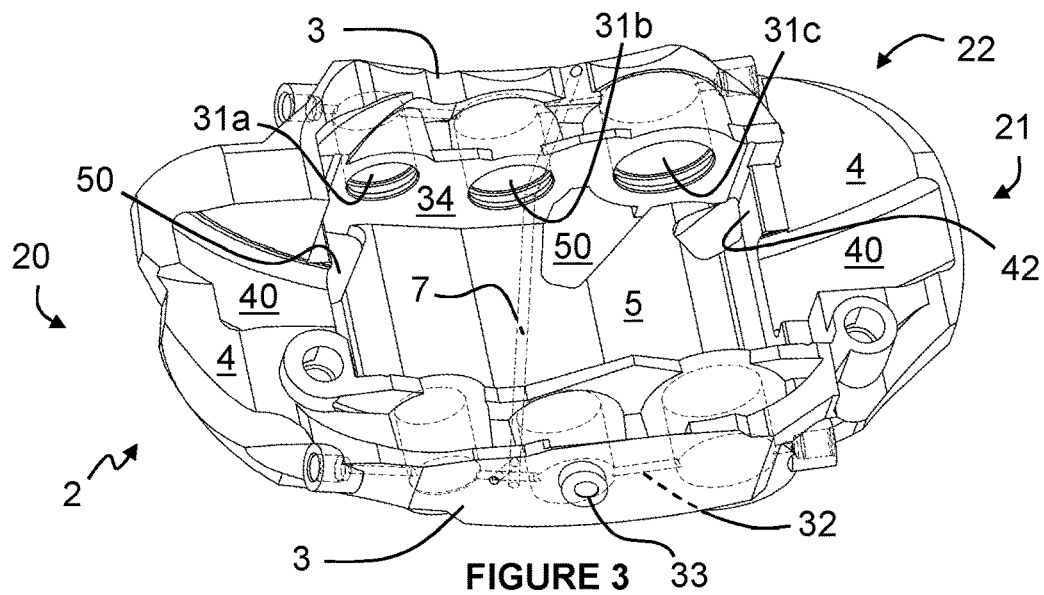
FIG. 3 is a perspective view of the disc receiving side of the brake caliper body of the brake caliper of FIGS. 1 and 2 with the hydraulic circuit outlined.
Figure 4:
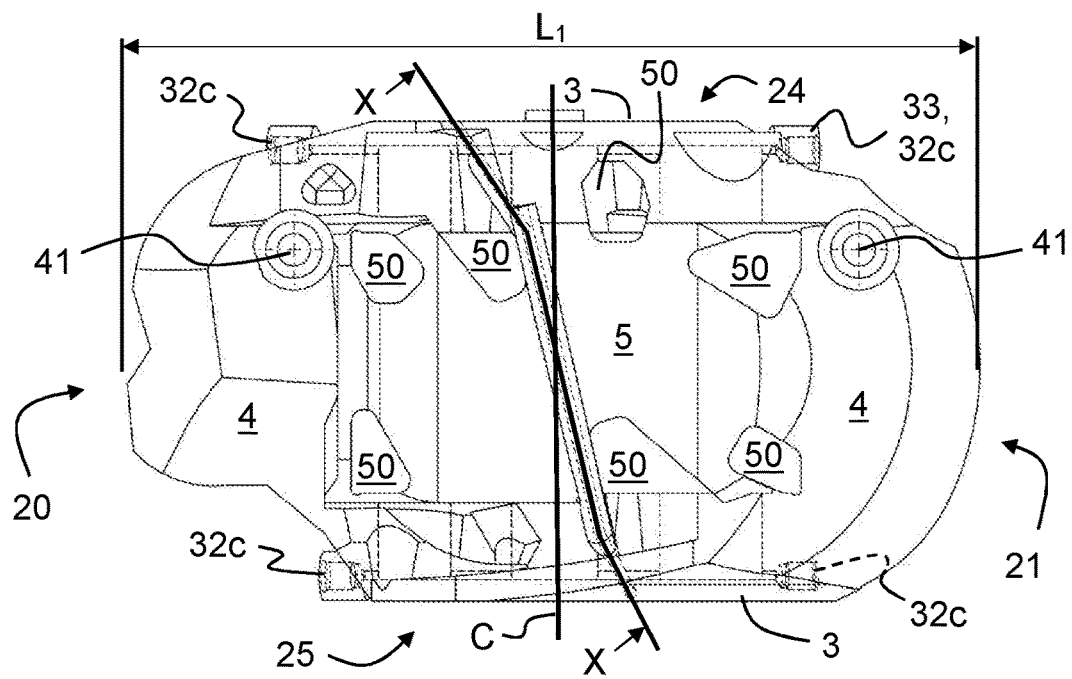
FIG. 4 is a top view of the brake caliper body of FIG. 3.

Referring to FIGS. 1 and 2, there is shown a brake caliper 1 including a caliper body 2 with a pair of spaced limbs 3, end bridging members 4, an intermediate bridging portion 5 and a series of actuating pistons 6a, 6b, 6c.

The caliper body 2, shown in FIGS. 1 to 6, includes a leading end 20, a trailing end 21, a brake disc receiving side 22, an outer side 23 opposite the brake disc receiving side 22, a mounting side 24 and a non-mounting side 25. The caliper body 2 also includes a longitudinal dimension $L_1$ measured along a longitudinal direction from the leading end 20 to the trailing end 21, a lateral dimension $L_2$ measured across the limbs 3 along a lateral direction orthogonal to the longitudinal dimension $L_1$ and a normal dimension N or height measured along a normal direction orthogonal to both the longitudinal dimension $L_1$ and the lateral dimension $L_2$.

Each limb 3 includes a respective hydraulic circuit 30 including three hydraulic cylinders 31a, 31b, 31c within which the actuating pistons 6a, 6b, 6c are slidably received and a fluid conduit 32 fluidly connecting the cylinders 31a, 31b, 31c. The caliper body 2 also includes a threaded inlet port 33 in an outer face of the limb 3 on the mounting side 24 and feeding into the central hydraulic cylinder 31b thereof. The hydraulic cylinders 31a, 31b, 31c are formed in opposing faces 34 of each limb 3 and are aligned to provide opposed hydraulic cylinder pairs 31a, 31b, 31c between which portions of the brake pads (not shown) are compressed against a brake disc by actuating the pistons 6a, 6b, 6c.

Figure 7:
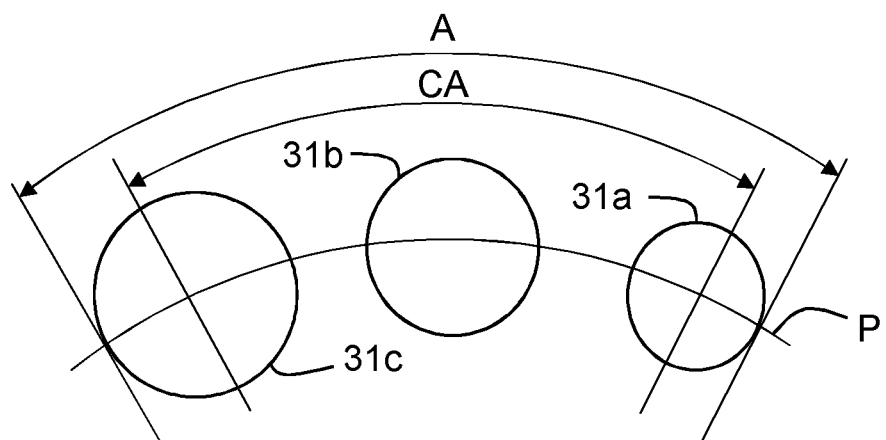
FIG. 7 is a schematic illustration of the hydraulic chamber layout on the inner face of the limb of the non-mounting side of the brake caliper body of FIGS. 3 to 6.

The cylinders 31a, 31b, 31c are arranged along an arcuate path such that a curved plane P passes through the central axis of each cylinder 31a, 31b, 31c, shown more clearly in FIG. 7, although this is not essential. An actuating zone A is defined between the opposed hydraulic cylinders 31a, 31b, 31c, which is also illustrated in FIG. 7 and a central activation zone is defined between the central axes of the outermost hydraulic cylinders 31a, 31c. The cylinder pairs 31a, 31b, 31c progressively increase in size from the leading end 20 to the trailing end 21 for reasons that are known in the art, although this is not essential. The caliper body 2 also includes a central plane C, shown in FIG. 4, intersecting each limb through the centre of the actuation zone A and through the central axis of the central hydraulic cylinder 31b and, in this embodiment, located at the centre of the longitudinal dimension $L_1$. In alternative embodiments, the central hydraulic cylinder 31b may be offset from the centre of the actuation zone A. It will be appreciated that where the hydraulic circuits 30 include an even number of hydraulic cylinders, the central plane would intersect the limb 3 between two hydraulic cylinders 31a, 31b, 31c assuming they are spaced evenly along the limb 3, although it may be advantageous to vary the relative spacing between them.

The fluid conduit 32 in each limb 3 in this embodiment is in two segments 32a, 32b. A first conduit segment 32a is formed by a drilling extending from the leading end 20 of the caliper body 2 and intersecting the central axis of each of the first two cylinders 31a, 31b, although this is not necessary and may vary based on the position and/or orientation of mounting in use. A second conduit segment 32b is formed by a drilling extending from the trailing end 21 of the caliper body 2 and intersecting the central axis of each of the second and third cylinders 31b, 31c, but this may vary as explained above. The exposed end of each conduit segment 32a, 32b is formed with a threaded port 32c for receiving a bleed screw (not shown), plug (not shown) or inlet fitting (not shown). In yet further embodiments it may not be necessary to accommodate a threaded port at the end of each conduit by incorporating a blind drilling from just one end or incorporating a suitable, alternative, plug arrangement.

Each of the end bridging members 4 joins together a respective end of each limb 3, includes a curved disc receiving channel 40 on the disc receiving side 22 of the caliper body 2 and a mountings 41 adjacent the end of each of the limbs 3. The end bridging members 4 also include opposed faces 42 that are orthogonal to the opposed faces 34 of the limbs 3 and together the opposed faces 34, 42 of the limbs 3 and end bridging members 4 describe a brake pad receiving zone. The disc receiving channel 40 and the brake pad receiving zone together define a cavity. The shape of the end bridging members 4 in this embodiment is illustrative and may vary to optimise the stress distribution based on the particular application. In addition, they may be provided with mountings 41 on either side 24, 25 such that both sides 24, 25 comprise mounting sides to provide a universal or non-sided caliper 1. In such embodiments, relevant features of shape of the caliper body 2 may also be arranged to be substantially symmetrical about a central plane defined by the longitudinal dimension $L_1$ and the normal dimension N to provide substantially the same performance irrespective of which side such a caliper 1 is mounted.

In this embodiment and in accordance with this invention, the end bridging members 4 are spaced from one another with an intermediate, central bridging portion 5 between them. The intermediate bridging portion 5 is in the form of a composite plate structure that forms a dome which spans the brake pad receiving zone and joins the limbs 3 and end bridging members 4 together. The intermediate bridging portion 5 in this embodiment includes seven windows 50 to enhance cooling, reduce weight and enable the brake pads (not shown) to be viewed therethrough. The intermediate bridging portion 5 also includes an integral pipe 51 embedded in part within the dome structure and protruding from the upper, outer surface thereof.

Figure 5:
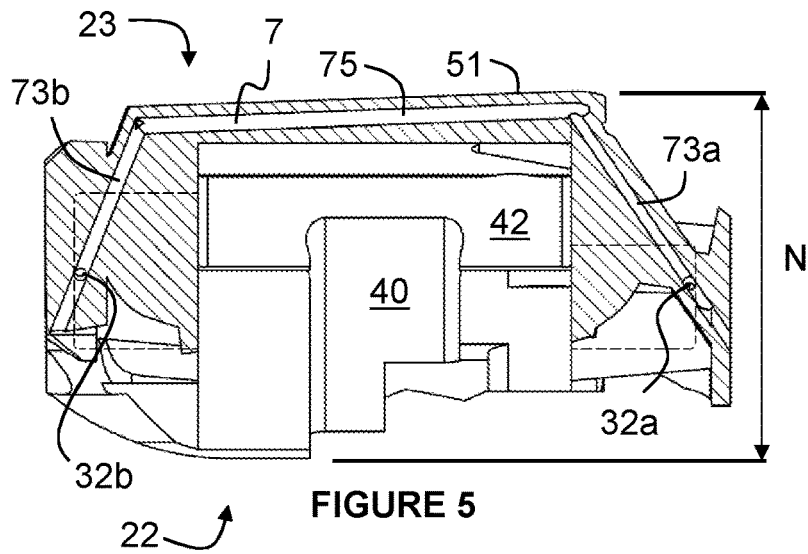
FIG. 5 is a section view of the brake caliper body of FIGS. 3 and 4 through line X-X in FIG. 4.
Figure 6:
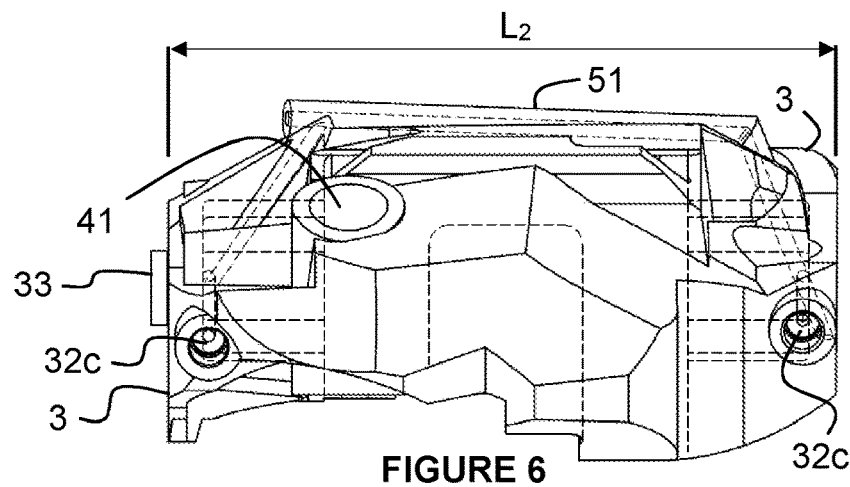
FIG. 6 is an end view of the brake caliper body of FIGS. 3 to 5 from the leading end thereof.

The hydraulic circuits 30 of the limbs are fluidly connected by a fluid channel 7, shown more clearly in FIG. 5. The fluid channel 7 includes two limb channel segments 73a, 73b, one of which is formed in each limb 3, and a bridging channel segment 75 formed in the integral pipe 51 of the intermediate bridging portion 5.

Each limb channel segment 73a, 73b extends from the fluid conduit 32, toward the outer or upper side 23, toward the opposite limb 3 and toward the central plane C and terminates at an intersection with the bridging channel segment 75. One of the limb channel segments 73a is connected to the first conduit segment 32a, while the other limb channel segment 73b is connected to the second conduit segment 32b. Both limb channel segments 73a, 73b extend at an angle relative to the normal direction and toward the central plane C, but terminate short thereof. In this embodiment, the bridging channel segment 75 joins the limb channel segments 73a, 73b and intersects the central plane C. It is also envisaged that the limb channel segments 73a, 73b may be configured such that they terminate at the central plane C or the same or a similar distance therefrom and the bridging channel segment 75 runs along or parallel to the central plane C. Other arrangements are also envisaged and, whilst it is preferable that the channel 7 runs along and/or intersects the central plane C this is not necessary. In this embodiment, one limb channel segment 73a also extends to a higher normal position than the other limb channel segment 73b and the bridging channel segment 75 extends at an angle relative to the normal direction such that one of its ends is higher than the other.

As explained above, the configuration of the channel 7 is such that air is encouraged to rise consistently within the system and move toward the bleed port 32c at the end of one of the hydraulic circuits 30. Furthermore, by having the end of the bridging channel segment 75 on the non-mounting side 25 of the caliper body 2 lower than end thereof on the mounting side 24, the external profile of the caliper 1 may be reduced, thereby improving packaging.

Each limb channel segment 73a, 73b is formed by a drilling extending from an outer surface in a lower portion of the limb 3 and terminating at the bridging channel segment 75, with the exposed end sealed using an expanded or threaded plug (not shown) or other suitable sealing means. Similarly, the bridging channel segment 75 is formed by a drilling extending from an outer surface of the limb 3 with the longer limb channel segment 73a and terminates at the terminal end of the shorter limb channel segment 73b, with the exposed end sealed using an expanded or threaded plug (not shown) or other suitable sealing means. Other means of forming the channel or any segment thereof are also envisaged and would be appreciated by the skilled person.

Figure 8:
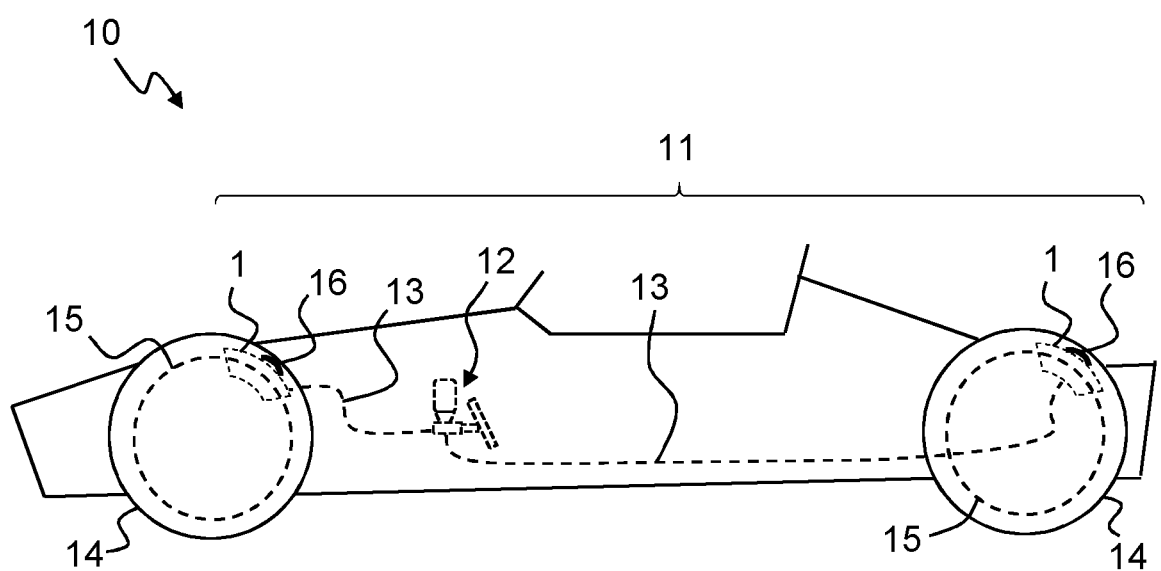
FIG. 8 is a schematic view of a vehicle with a braking system including four brake calipers according to an embodiment of the invention.

As illustrated schematically in FIG. 8, a vehicle 10 may be provided that includes a braking system 11 within which is incorporated four brake calipers 1 according to the invention fluidly connected to a master cylinder 12 by respective brake pipes 13. The vehicle 10 includes four wheels 14 each having a brake disc 15 coupled thereto for rotation therewith and that is received by a respective one of the brake calipers 1 to stop the vehicle 10 in a usual way.

Whilst FIG. 8 illustrates brake calipers 1 in an upper trailing configuration, that is to say above the wheel centreline but 'trailing' the wheel, the skilled person will appreciate that the brake calipers 1 according to the invention are not limited to such a configuration. More particularly, the same caliper 1 can be used in either a leading or trailing configuration. In a traditional crossover channel arrangement within one of the end bridging sections, such a configuration requires compromise. With the traditional arrangement, the crossover channel is located in the lowest bridging section based upon its mounting as this encourages air to escape and when such a caliper moves from a leading position to a trailing position this crossover moves from the bottom bridging section to the top.

Contradistinctively, in the caliper 1 of the present invention the channel 7 it remains broadly central and the angles of the channel segments ensure that regardless of whether the caliper 1 is in a leading position or a trailing position, the air always moves upward. Indeed, this aspect of the invention also enables the caliper body 2 to be configured symmetrically to provide a non-handed caliper 1. It is also envisaged that the caliper 1 may be positioned in any orientation about the brake disc 15, even with a portion of the lower half of the brake disc 15 received thereby, although it is preferable that the caliper 1 receives a portion of the upper half of the brake disc 15 in either a leading or a trailing position.

In use, fluid pressure is introduced into the inlet port 33, into the hydraulic chamber 31*b* of the limb 3 on the mounting side 24 and spreads outwardly into the other two hydraulic chambers 31*a*, 31*c*, through the fluid channel 7 and into the hydraulic circuit 30 of the other limb. Whilst not wishing to be bound by any theory, it is believed that by connecting the fluid channel 7 adjacent the centre of each hydraulic circuit 30 a better fluid balance is achieved.

It will be appreciated by those skilled in the art that by virtue of the aforementioned caliper body design, brake fluid contained within the fluid channel 7 is spaced from the regions of the caliper 1 that are typically subjected to the highest stresses and temperatures. More particularly, the friction surfaces of the brake disc 15 reach high temperatures during high loading conditions and the close proximity between these surfaces and the end bridging members 4 leads to high temperatures. The end bridging members 4 are also subjected to high bending stresses when the pistons 6*a*, 6*b*, 6*c* are actuated. The intermediate, central bridging portion 5 is spaced from these regions and is not subjected to the same temperatures and the end bridging members 4 of the caliper 1 do not suffer from the loss of material that would otherwise result from the channel 7 being formed therein as with in the aforementioned prior art designs.

In addition, the design of the intermediate bridging portion 5 also enhances the cooling effectiveness of a flow of cooling medium, e.g. air, across the outer surfaces of the caliper body 2. More specifically, the projecting surface of the part-cylindrical surface of the integral pipe 51 through which the bridging channel segment 75 extends increases the heat transfer surface area and can encourage a more turbulent flow of the cooling medium and thus provides greater cooling capacity to the fluid within the channel. Whilst this phenomenon improves the more central the fluid channel 7, it will be appreciated that the invention envisages that the fluid channel 7 may be located anywhere between the end bridging members 4. It is preferable that at least part of the fluid channel 7 is located above, or on the outer side and aligned with, the actuating zone A of the caliper body, more preferably aligned the central actuating zone CA (both illustrated in FIG. 7). It is yet more preferable that the whole of the fluid channel 7 is entirely within these zones and it is most preferable that at least part of the fluid channel 7 is at or about the central plane C.

It will also be appreciated by those skilled in the art that the present invention enables closer coupling of the hydraulic circuits 30 to the inlet, which ensures a more even pressure build up within the caliper limbs.

It will also be appreciated by those skilled in the art that when the caliper 1 is mounted in either a trailing position (as shown in FIG. 8) or in a leading position, the configuration of the fluid channel 7 encourages air to rise consistently within the system and move toward the bleed port 32*c* at the end of one of the hydraulic circuits. It will also be appreciated that, while not essential, when the caliper 1 is mounted on the right hand side in the trailing position, the plugged end of the bridging channel segment 75 will also be below the blind end of the bridging channel segment 75, which also encourages air that might otherwise be trapped in the area immediately in front of the plug to rise toward the bleed port 32*c*.

One optional feature of the invention involves the inclusion of one or more cooling ducts 16, illustrated schematically in FIG. 8, mounted over the intermediate bridging portion 5 for directing a cooling medium therethrough. The outer surface of the intermediate bridging portion 5 preferably cooperates with the cooling duct 16 to describe a substantially sealed flow passage such that a flow of cooling medium, e.g. air, removes heat from the intermediate bridging portion 5, thereby cooling the bridging channel segment 75 of the fluid channel 7.

It will be appreciated by those skilled in the art that several variations to the aforementioned embodiments are envisaged without departing from the scope of the invention. For example, the caliper body 2 may be formed in two or more parts and/or comprise two or more intermediate bridging portions 5. The fluid channel 7 may be fluidly connected to one of the hydraulic cylinders 31*a*, 31*b*, 31*c*, e.g. the central hydraulic cylinder 31*b*, instead of or in addition to the fluid conduit 32, e.g. either segment 32*a*, 32*b* thereof. Additionally or alternatively, the fluid channel 7 may be fluidly connected to a transition portion (not shown) between the hydraulic cylinders 31*a*, 31*b*, 31*c* and the fluid conduit 32 either alone or in any conceivable combination. The fluid channel 7 need not extend through the intermediate, central bridging portion 5 or indeed any bridging portion 5, e.g. it may be formed in or provided by another feature such as an external pipe. Several other variations are mentioned above and in the claims and the skilled person would understand and appreciate that any such features may be beneficial alone or in any suitable combination.

It will also be appreciated by those skilled in the art that any number of combinations of the aforementioned features and/or those shown in the appended drawings provide clear advantages over the prior art and are therefore within the scope of the invention described herein.

The invention claimed is:

1. A brake caliper body comprising a pair of spaced limbs, a pair of bridging members each joining together a respective end of each limb, an intermediate bridging portion between the bridging members, a longitudinal dimension across its ends, a lateral direction across its limbs and a normal direction orthogonal to each of the longitudinal and lateral dimensions, wherein each limb comprises a hydraulic circuit including two or more fluidly connected hydraulic cylinders for receiving respective pistons and the hydraulic circuits are fluidly connected together by a channel at least part of which is formed in the intermediate bridging portion, the channel extending across the space between the limbs and between the bridging members, wherein the channel is fluidly connected to one hydraulic circuit at a different longitudinal position than the other hydraulic circuit.

2. A brake caliper body according to claim 1, wherein the channel extends diagonally across the space between the limbs and between the bridging portions.

3. A brake caliper body according to claim 2, wherein the channel comprises a limb channel segment in each limb and a bridging channel segment in the intermediate bridging portion fluidly connecting the limb channel segments together, wherein the bridging channel segment extends diagonally between the limbs.

4. A brake caliper body according to claim 1, wherein the intermediate bridging portion comprises a surface feature adjacent or at least partially surrounding the channel for improving heat transfer between brake fluid contained, in use, within the channel and a cooling medium passing over the caliper body.

5. A brake caliper body according to claim 1, wherein the channel is provided within a pipe formed integrally with the intermediate bridging portion at least a portion of which is exposed.

6. A brake caliper body according to claim 2 comprising a disc receiving side, an outer side opposite the disc receiving side and an brake pad receiving zone described by opposed faces of the limbs and opposed faces of the bridging members, wherein the channel extends across the space between the limbs on the outer caliper body side of and aligned with the brake pad receiving zone.

7. A brake caliper body according to claim 2 comprising a disc receiving side, an outer side opposite the disc receiving side and an actuation zone described between opposed hydraulic cylinders of the limbs, wherein the channel extends across the space between the limbs on the outer caliper body side of and aligned with the actuating zone.

8. A brake caliper body according to claim 2 comprising a disc receiving side, an outer side opposite the disc receiving side, wherein the two or more hydraulic cylinders of each hydraulic circuit comprise outer hydraulic cylinders and the channel extends across the space between the limbs on the outer caliper body side of and aligned between central axes of the outermost hydraulic cylinders.

9. A brake caliper body according to claim 1 comprising a central plane intersecting each limb, wherein at least part of the channel intersects the central plane.

10. A brake caliper body according to claim 1 comprising one or more windows, pockets or recesses between the bridging members.

11. A brake caliper body according to claim 1, wherein the channel is formed entirely within the body.

12. A brake caliper body according to claim 1, wherein the intermediate bridging portion comprises a dome or plate portion.

13. A brake caliper body according to claim 1, wherein at least one of the hydraulic circuits comprises a pair of outer hydraulic cylinders, an inner hydraulic cylinder and an inlet port feeding directly into the inner hydraulic cylinder.

14. A brake caliper body according to claim 1 formed as a single piece.

15. A brake caliper body according to claim 1 with a cooling duct mounted over the space between the limbs and between the bridging members for directing, in use, a cooling medium therethrough.

16. A brake caliper comprising a body according to claim 1 with a respective piston in each hydraulic cylinder.

17. A brake caliper body comprising a pair of spaced limbs, a pair of bridging members each joining together a respective end of each limb, a longitudinal dimension across its ends, a lateral dimension across its limbs and a normal dimension orthogonal to each of the longitudinal and lateral dimensions, each limb comprising a hydraulic circuit including one or more hydraulic cylinders, wherein the hydraulic circuits are fluidly connected together by a channel extending across the space between the limbs and between the bridging members, wherein the channel intersects one hydraulic circuit at a different longitudinal position than the other hydraulic circuit.

18. A brake caliper body comprising a pair of spaced limbs, a pair of bridging members each joining together a respective end of each limb, a longitudinal dimension across its ends, a lateral dimension across its limbs and a normal dimension orthogonal to each of the longitudinal and lateral dimensions, each limb comprising a hydraulic circuit including one or more hydraulic cylinders, wherein the hydraulic circuits are fluidly connected together by a channel extending across the space between the limbs and between the bridging members, wherein the channel intersects one limb at a different normal position than the other limb such that it extends at an angle relative to the lateral dimension.

* * * * *